Sept. 21, 1954  A. G. OBOLENSKY  2,689,901
SOLDERING TOOL
Filed Jan. 5, 1952
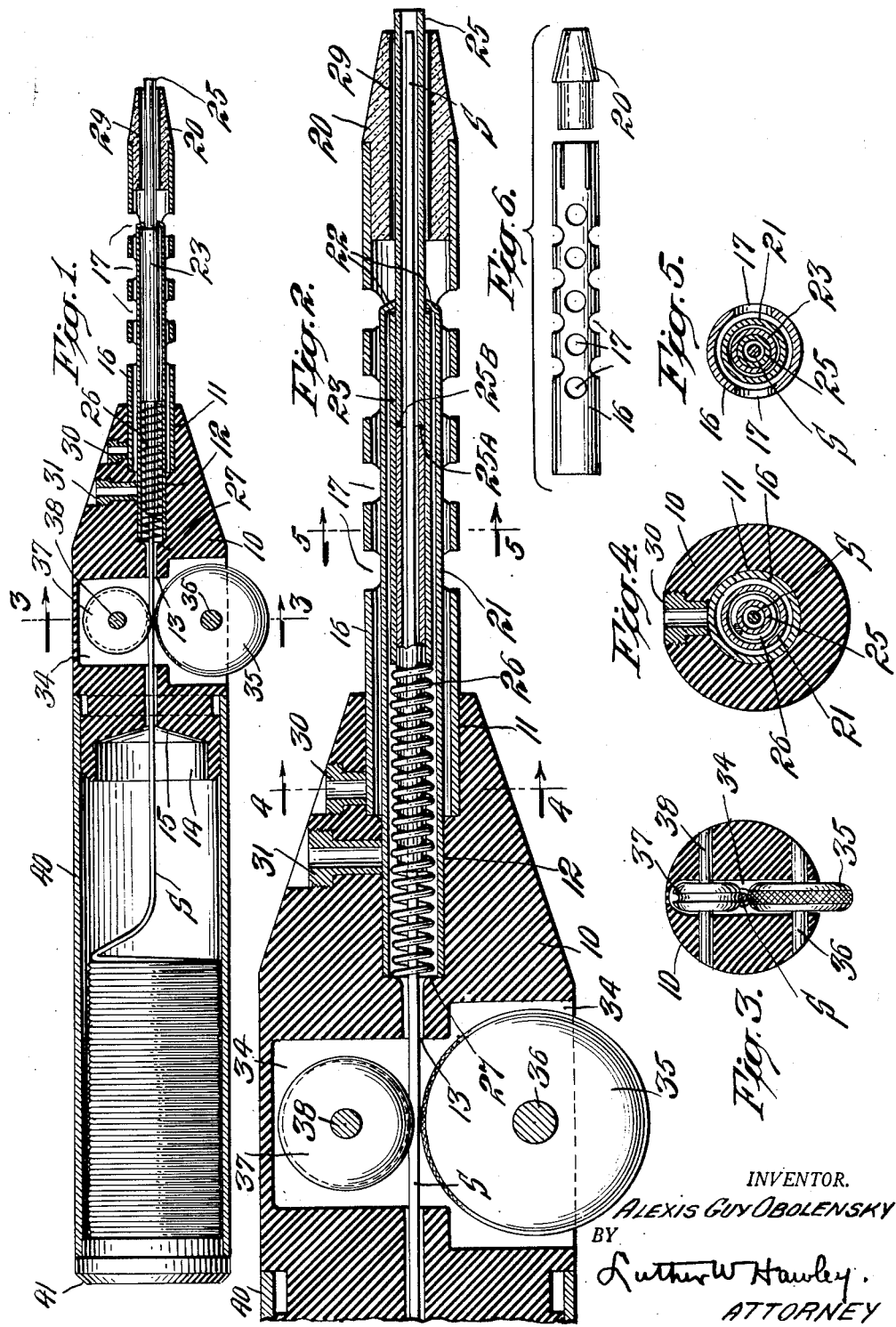
INVENTOR.
ALEXIS GUY OBOLENSKY
BY
Luther W Hawley.
ATTORNEY Patented Sept. 21, 1954

2,689,901

UNITED STATES PATENT OFFICE 2,689,901

SOLDERING TOOL

Alexis Guy Obolensky, New York, N. Y., assignor to The Solder-Weld Corporation, New York, N. Y., a corporation of New York Application January 5, 1952, Serial No. 265,180

1 Claim. (Cl. 219—27)

This invention relates to a soldering iron or tool.

More particularly stated, the invention relates to an electric soldering tool capable of being operated by one hand.

The invention has for its salient object to provide a tool of the character described that comprises few parts, can be economically manufactured and assembled, and will operate efficiently.

Another object of the invention is to provide a tool of the character described that can be operated to solder a connection or joint from any angle.

Another object of the invention is to provide a tool of the character described that will have long life and is economical to operate.

Further objects of the invention will appear from the following specification taken in connection with the drawings which form a part of this application, and in which:

Fig. 1 is a longitudinal sectional elevation of a tool constructed in accordance with the invention;

Fig. 2 is a sectional elevation, on an enlarged scale, of the front end portion of the tool;

Fig. 3 is a transverse sectional elevation on line 3—3 of Fig. 1, looking in the direction of the arrows;

Fig. 4 is a transverse sectional elevation on line 4—4 of Fig. 2, looking in the direction of arrows;

Fig. 5 is a tranverse sectional elevation on line 5—5 of Fig. 2, looking in the direction of the arrows; and Fig. 6 is an elevational exploded view of the tube and carbon electrode.

The invention, briefly described, consists of a soldering tool adapted for operation on low voltage and having a pair of electrodes and means for feeding a rod or pencil of solder to a position adjacent said electrodes. One electrode is slidable in the base relative to the other electrode and is resiliently forced outwardly to a limited extent. In the specific embodiment illustrated, the electrodes are tubular and concentric and the solder is fed through the slidable tubular electrode. Further details of the invention will appear from the following description.

In the particular embodiment of the invention illustrated, the tool has a base block 10 of insulating material, the block having a central opening therethrough, this bore comprising stepped bores or openings 11, 12 and 13. The rear end of the block has a recess 14 having a conical inner surface 15.

A metallic tube 16 is mounted in the bore 11 and has ventilating holes 17. A carbon electrode 20 is mounted in the outer end of the tube 16.

A second metallic tube or sleeve 21 is mounted in the bore 12 and has an inturned flange 22 at its front end. A sleeve 23 is slidably mounted in sleeve 21 and has fixedly mounted therein a tubular electrode 25 comprising abutting sections 25A and 25B, the tubular electrode extending beyond the sleeve 23 in both directions.

A spring 26 encircles the inner end of the tubular electrode 25 and engages the inner end of sleeve 23 and abuts against a shoulder 27 at the inner end of bore 12. The forward movement of the sleeve 23 and tubular electrode 25 is limited by the engagement of flange 22 by the outer end of sleeve 23. Normally, the outer end of the electrode 25 projects beyond the outer end of electrode 20, as shown in Figs. 1 and 2.

It will be noted that the electrode 25 is spaced from the bore of the carbon electrode 20 and, if desired, the bore of the carbon electrode may be lined, as shown at 29, with insulating material or, alternatively, the outer surface of the portion of electrode 25 within the electrode 20 may have an insulating coating.

The tube 16 is secured in the base block 10 by a metallic bushing 30, and the sleeve 21 is held in the bore 12 of block 10 by a metallic bushing 31.

The electrical leads for the two electrodes are secured in the bushings 30 and 31.

The block 10 is recessed, as shown at 34, to receive a solder feed wheel 35 mounted on pin 36 and an idler wheel 37 mounted on a pin 38.

The solder, in the form of a wire or rod S, is stored in a coil disposed in a cylinder 40 which is mounted on the rear or inner end of the block 10 and forms the handle for the soldering tool. A plug 41 closes the rear end of the cylinder 40.

The solder wire is led through the bores 11, 12 and 13 of block 10, between wheels 35 and 37, and through the inner tubular electrode 25.

In use, the outer end of electrode 25 first engages the work and is pushed in until the electrode 20 engages the work. The work or joint engaged by the electrodes is thus heated and then the wheel 35 is rotated in a clockwise direction, viewing Figs. 1 and 2, to feed the solder wire to the work or joint to be made.

It will be evident from the foregoing specification that the joint can be soldered easily and quickly from any angle and by the use of one hand of the operator.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claim.

What I claim is:

A soldering tool comprising a base of insulating material, a metal tube mounted in and projecting from said base, an electrode mounted on the outer end of said tube, means for making an electrical contact with said tube, a second tube mounted in said base and spaced from the first tube, a tubular electrode slidably mounted in the second tube and normally projecting beyond the outer end of the electrode mounted in the first tube, said tubular electrode having sliding contact with said second tube, means for making an electrical contact with the second tube, resilient means for forcing said tubular electrode outwardly, and means for feeding a solder pencil through the tubular electrode.

References Cited in the file of this patent

UNITED STATES PATENTS

| Number | Name | Date |
|---|---|---|
| 2,119,462 | Kull et al. | May 31, 1938 |
| 2,210,352 | Albietz | Aug. 6, 1940 |
| 2,251,557 | Weston | Aug. 5, 1941 |

FOREIGN PATENTS

| Number | Country | Date |
|---|---|---|
| 494,419 | Great Britain | Oct. 21, 1938 |
| 577,683 | Great Britain | May 28, 1946 |